United States Patent Office 2,860,065
Patented Nov. 11, 1958

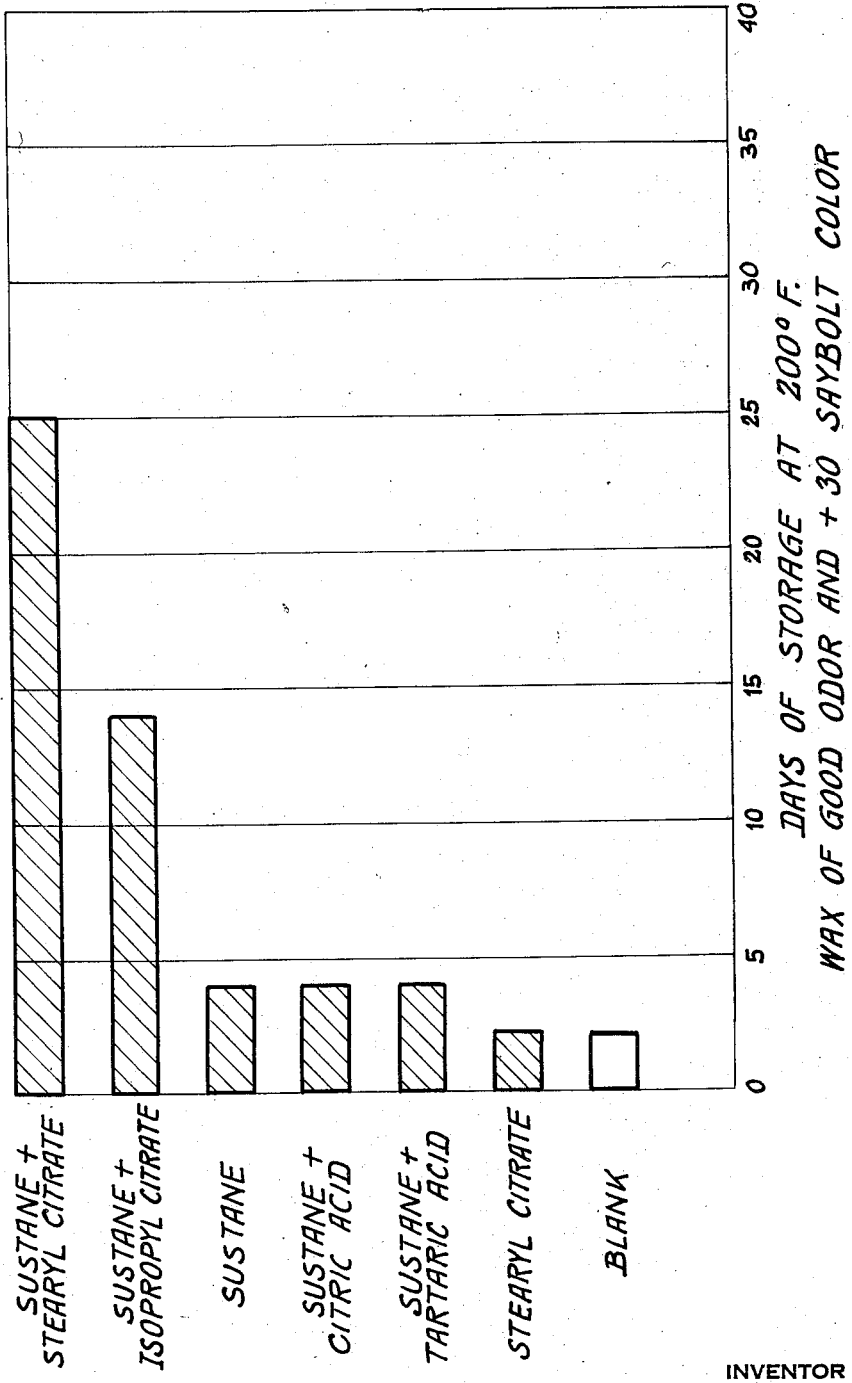

2,860,065

STABILIZED PETROLEUM WAX

Charles F. Duchacek, Long Island City, N. Y., assignor to Socony Mobil Oil Company, Inc., a corporation of New York Application January 26, 1955, Serial No. 484,155

4 Claims. (Cl. 106—270)

This invention has to do with the stabilization of petroleum products against the harmful effects of oxidation and deterioration with use. More particularly, the present invention is primarily directed to the stabilization of mineral oil fractions, and particularly petroleum wax fractions, by the use of a novel combination of compounds which together exert a synergistic stabilizing effect.

As is well known in the art, petroleum waxes—and particularly paraffin waxes—oxidize readily. Oxidation takes place at elevated temperatures, for example, oxidation occurs when the wax is kept in a molten condition in open tanks. Also when paraffin waxes are dried by airblowing at temperatures of the order of 170° F. to 210°F., an offensive rancid odor generally develops. However, even at relatively low temperatures, as at 65–80° F., solid paraffin waxes can develop a rancid odor in prolonged storage. In addition, paraffin waxes when undergoing oxidation darken considerably in color.

Inasmuch as petroleum waxes are used in the compounding of pharmaceutical specialties, such as ointments, it is necessary that they be free of disagreeable odors. Still other uses for paraffin waxes requiring substantially odor-free materials include: food coatings, paper and cardboard food containers, milk containers, grease-proof paper, frozen-food wraps, fruit-wrap papers and the like. It is apparent, then, that if paraffin waxes are to be suitable for such uses it is necessary to shield them from oxygen or its is necessary to make them resistant to oxidation. Obviously, it is difficult—if not economically impractical—to shield paraffin waxes from the atmosphere when using or storing the same. In addition, it will be recognized that toxicity is a major factor with waxes used for bread wrappings, milk cartons and the like. Toxicity is of no moment when waxes are used for candles.

Methods hitherto proposed for making paraffin waxes resistant to oxidation have generally proven inefficient or excessively expensive. For example, two such methods which have not been entirely successful are: (1) treatment with steam to drive off volatile organic acids, and, (2) filtration through clay to remove acids by adsorption.

This problem has also been approached through the additive route. Several additives have been used with more or less success to counteract the oxidation of paraffin waxes. However, such additives as have been used generally are effective in stabilizing wax against either color deterioration or the development of a rancid odor, but these additives generally do not stabilize the wax against both of these deleterious effects. Propyl gallate is an example of one material used for this purpose. Another is a tertiary butylated hydroxyanisole, which has been sold under the commercial name of "Sustane."

Waxes have also been treated to improve their color. One such approach to this problem has been to incorporate substantial amounts of stearic acid with the wax. For example, 15% by weight of stearic acid has been used commercially with paraffin wax. Initially, stearic acid has a whitening effect on the wax. However, stearic acid darkens when exposed to light. Stearic acid is generally applied as an outer coating to such materials as candles to stiffen the latter as well as impart the initial whitening effect. It will be appreciated that light stability of candles is an important feature, because samples of candles oftentimes are displayed in show windows.

It has now been discovered that the aforesaid deleterious effects of oxidation can be counteracted by a combination of additives which together behave synergistically. One of the additives is generally regarded as the antioxidant and the second of the additives is generally designated as the synergist. Here, it has been found that tertiary butylated hydroxyanisoles, otherwise known as "Sustane," and related materials behave as antioxidants. In combination therewith is the synergist, stearyl citrate and related materials. Each of these materials is used in relatively small concentrations.

It is an object of this invention, therefore, to protect materials susceptible to oxidation against the general effects of oxygen whether in storage or in use. It is a primary object of this invention to protect wax and related hydrocarbon fractions against the deleterious effects of oxidation, in particular to protect such materials against color and odor deterioration. Another object is to provide a product resistant to oxidation when stored at elevated temperatures. Still another object is the provision of a product resistant to oxidation when exposed to light for relatively long periods of time. It is another object of this invention to further improve wax and stearic acid blends.

Another important object of this invention is to provide a new and novel composition of matter comprising a synergistic combination of materials. Other objects of this invention will be apparent from the following description of the invention.

As indicated above, the antioxidant contemplated herein is a hydroxyanisole containing an alkyl group of at least four carbon atoms, preferably from four to about eight carbon atoms. Tertiary butylated hydroxyanisoles such as

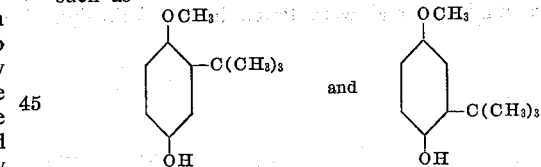

are preferred herein, particularly mixtures of such isomers.

The synergist contemplated here comprises an alkyl ester of citric acid wherein the esterifying group or groups is a hydrocarbon solubilizing group. Outstanding of such esters is tristearyl citrate. Generally, the esterifying group for citric acid contains at least about twelve carbon atoms. It will be understood that from one to three of such groups can be present in the ester, and that mixtures of such mono-, di- and tri-esters can be used.

The antioxidant and synergist, described above, can be incorporated simply in a hydrocarbon product such as a petroleum wax. The additives are added to wax and stirred into the same, in which they are readily dispersed. It has been found that temperature has some effect on the ease with which the additives become readily dispersed in the wax. In general, it is recommended that the wax be heated to a temperature of about 160° to 180° F., whereupon the additives are added and stirred or mixed into the hot wax. The concentration of the antioxidant and of the synergist are so small that little difficulty is encountered in dispersing or mixing the same in the wax. The antioxidant is generally used in concentrations from about 0.00005 to about 0.1% of the wax, preferably from about 0.0001 to about 0.005%. Correspondingly, the synergist is usually present in amounts ranging from 0.00005 to about 0.1% by weight, with preference to amounts ranging from 0.0001 to about 0.005%.

Heat stability of wax and wax containing various additives is shown in the figure attached hereto containing a bar graph. In this instance, the wax and wax blends were stored in contact with iron in an oven at 200° F. and were periodically sampled for color and odor ratings. The wax used was a 125–127° F. melting point, refined paraffin wax. The odor tests were conducted in the following manner: A small quantity of the wax sample was shaved into a clean, odorless container. The container was sealed and allowed to stand for at least one hour before it was reopened and the wax sample smelled. One sample was prepared as indicated for each observer because repeated opening of the container allows the odor to be dissipated. The odor of the wax is rated in the following manner: 1 no odor; 1.5 very slight odor; 2 mild odor; 3 moderate odor; 4 strong odor. An arithmetical average of ratings of the observers is taken as the final result.

Referring to the bar graph, it will be seen that the blank wax has a stability of only two days. When a small amount of Sustane is added to the wax, the stability improved to four days. It is to be noted that small amounts of citric acid and tartaric acid do not improve further the wax containing Sustane.

Opposed to these results, are the results obtained with a combination of Sustane and stearyl citrate; the resulting product has a stability of twenty-five days. This is entirely unexpected since stearyl citrate used alone in the wax will provide a stability of only two days, and Sustane alone will provide a stability of only four days. Thus, the combination of Sustane and stearyl citrate, on a theoretical basis, would be only about six days, instead of the twenty-five days actually found by experimentation.

Tristearyl citrate was used in the tests shown by the bar graph, and in the tests shown hereinbelow.

Oftentimes in commercial operations, wax is stored over water rather than in a dry tank. It has been found that wax stored over water is less stable than wax stored in a dry tank. Wax samples and wax containing additives were made up and were tested in the following manner. One sample was added to a beaker wherein iron nails were present. Another sample was added to a beaker, 100 grams of wax sample being so added, together with 100 grams of water. Iron nails were then added to the latter. These beakers were then stored at 180° F. Results of such tests are set below in Table I. The Saybolt color was determined by the method of ASTM designation D–153–T (see ASTM Standards on Petroleum Products and Lubricants, November 1954 edition, page 93).

TABLE I

| Variables | Average Days Of 1.5 Odor | Saybolt Color | |
|---|---|---|---|
| | | Before | After |
| Effect of Stearyl Citrate Concentration In Presence of Sustane (0.0002%): | | | |
| 0.0025% | 33 | +30 | +26 |
| 0.0002% | 28 | +30 | +27 |
| Effect of Sustane Concentration: | | | |
| 0.0025% | 37 | +30 | +24 |
| 0.0002% | 29 | +30 | +26 |

Analysis of variables effecting the light stability of paraffin wax, in the presence of antioxidants when stored in the Fade-O-Meter for 96 hours, is provided in Table II below:

TABLE II

| Variables | Average Results, 96 Hours Exposure Saybolt Color | |
|---|---|---|
| | Before | After |
| Effect of Stearyl Citrate Concentration In Presence Of Sustane (0.0002%): | | |
| 0.0025% | +26 | +17 |
| 0.0002% | +25 | +20 |
| Effect of Sustane Concentration: | | |
| 0.0025% | +24 | +15 |
| 0.0002% | +27 | +22 |

Additional heat stability results are provided in Table III below. These results were obtained by subjecting wax and wax-additive blends at 180° F. in contact with iron for various periods of time.

TABLE III

Storage at 180° F. in contact with iron

| Sustane, Percent By Weight | Stearyl Citrate, Percent By Weight | Dry Wax | Wax Over Water | Days of 1.5 Odor | Saybolt Color | | Fade-O-Meter, 96 Hours Exposure Saybolt Color | |
|---|---|---|---|---|---|---|---|---|
| | | | | | Before | After | Before | After |
| -------- | -------- | Yes | -------- | 5 | +30 | +30 | +30 | +17 |
| -------- | -------- | -------- | Yes | 1 | +30 | +30 | ------ | ------ |
| 0.0025 | -------- | Yes | -------- | 60 | +30 | +15 | +30 | +17 |
| 0.0025 | -------- | -------- | Yes | 55 | +30 | +14 | ------ | ------ |
| 0.0002 | -------- | Yes | -------- | 57 | +30 | +17 | +30 | +22 |
| 0.0002 | -------- | -------- | Yes | 53 | +30 | +16 | ------ | ------ |
| -------- | 0.0025 | Yes | -------- | 7 | +30 | +30 | +30 | +30 |
| -------- | 0.0025 | -------- | Yes | 3 | +30 | +30 | ------ | ------ |
| -------- | 0.0002 | Yes | -------- | 7 | +30 | +30 | +30 | +30 |
| -------- | 0.0002 | -------- | Yes | 7 | +30 | +30 | ------ | ------ |
| 0.0002 | 0.0002 | Yes | -------- | 24 | +30 | +26 | +30 | +21 |
| 0.0002 | 0.0002 | -------- | Yes | 18 | +30 | +26 | ------ | ------ |
| 0.0002 | 0.0025 | Yes | -------- | 37 | +30 | +30 | +30 | +28 |
| 0.0002 | 0.0025 | -------- | Yes | 37 | +30 | +23 | ------ | ------ |

Data shown above in Table III indicate that 0.0002 percent by weight of Sustane and 0.0025 percent by weight of stearyl citrate is an optimum combination.

Further heat stability results are shown in Table IV which follows below.

TABLE IV

*Effect of antioxidants upon the heat stability of 125–127° F. (M. P.) paraffin wax when stored at 200° F. in contact with iron*

| Antioxidant | Percent By Weight | Synergist | Percent By Weight | Days of +30 Saybolt Color | Odor Before | Odor After | Days of 1.5 Odor | Saybolt Color Before | Saybolt Color After |
|---|---|---|---|---|---|---|---|---|---|
| Sustane | 0.0025 | | | 3 | 1.5 | 4.0 | 2 | +30 | +30 |
| Do | 0.0025 | Stearyl Citrate | 0.01 | 4 | 1.5 | 1.5 | 42 | +30 | −1 |
| Do | 0.0025 | Isopropyl Citrate | 0.01 | 25 | 1.5 | 1.5 | 42 | +30 | +24 |
| Do | 0.0025 | Citric Acid | 0.0025 | 14 | 1.5 | 1.5 | 32 | +30 | +22 |
| Do | 0.0025 | Tartaric Acid | 0.005 | 4 | 1.5 | 1.5 | 14 | +30 | +22 |
| Do | 0.0025 | | | 4 | 1.5 | 1.5 | 15 | +30 | +0 |

In Table V given below, additional heat stability results are shown. Here, the heat stability of dry paraffin wax and paraffin wax floating over water was determined at 180° F. in contact with iron.

As indicated earlier, wax used for candles and the like generally contain an outer coating comprising a blend of wax and stearic acid. The stearic acid is generally used for whitening and stiffening the candles. The effect of Sustane and stearyl citrate of wax-stearic acid blends is demonstrated below by the results set out in Table VI.

TABLE V

*Effect of antioxidant concentration upon the heat stability of dry paraffin wax and paraffin wax floating over water at 180° F. in contact with iron*

| Antioxidant | Percent By Weight | Synergist | Percent By Weight | Dry Wax | Wax Over Water | Days of +30 Saybolt Color | Odor Before | Odor After | Days 1.5 Odor | Saybolt Color Before | Saybolt Color After |
|---|---|---|---|---|---|---|---|---|---|---|---|
| | | | | Yes | | 10 | 1.5 | 4.0 | 5 | +30 | +30 |
| | | | | | Yes | 5 | 1.5 | 4.0 | 1 | +30 | +30 |
| | | Stearyl Citrate | 0.0002 | Yes | | 10 | 1.5 | 4.0 | 7 | +30 | +30 |
| | | do | 0.0002 | | Yes | 10 | 1.5 | 4.0 | 7 | +30 | +30 |
| | | do | 0.0025 | Yes | | 10 | 1.5 | 4.0 | 7 | +30 | +30 |
| | | do | 0.0025 | | Yes | 5 | 1.5 | 4.0 | 3 | +30 | +30 |
| Sustane | 0.0002 | | | Yes | | 6 | 1.5 | 1.5 | 20 | +30 | +23 |
| Do | 0.0002 | | | | Yes | 3 | 1.5 | 1.5 | 10 | +30 | +26 |
| Do | 0.0002 | Stearyl Citrate | 0.0002 | Yes | | 19 | 1.5 | 1.4 | 24 | +30 | +26 |
| Do | 0.0002 | do | 0.0002 | | Yes | 10 | 1.5 | 1.8 | 18 | +30 | +30 |
| Do | 0.0002 | do | 0.0025 | Yes | | 40 | 1.5 | 4.0 | 37 | +30 | +30 |
| Do | 0.0002 | do | 0.0025 | | Yes | 8 | 1.5 | 1.5 | 37 | +30 | +23 |
| Do | 0.0025 | do | 0.0002 | Yes | | 40 | 1.5 | 4.0 | 34 | +30 | +30 |
| Do | 0.0025 | do | 0.0002 | | Yes | 10 | 1.5 | 1.5 | 34 | +30 | +23 |
| Do | 0.0025 | do | 0.0025 | Yes | | 40 | 1.5 | 4.0 | 37 | +30 | +19 |
| Do | 0.0025 | do | 0.0025 | | Yes | 8 | 1.5 | 1.5 | 42 | +30 | +19 |

Inspection of results set out in Table V reveals that, in keeping with earlier findings, wax is more suitable when stored in the dry condition, rather than when stored over water. In this connection, it will be noted that the stability of dry wax is ten days as opposed to five for the wet wax when the standpoint of color is observed. The odor stability of the dry wax is five days opposed to one day for the wet wax. Some measure of improvement is realized with Sustane alone, when used in a concentration of 0.0002%. Correspondingly, a small amount of improvement is realized with stearyl citrate alone. However, when Sustane and stearyl citrate are used together, a large and unexpected degree of improvement is realized. This is particularly pronounced in the case of a dry wax. A lesser improvement is obtained with a combination of the additives, when the wax sample is stored over water.

TABLE VI

*Effect of antioxidants on wax-stearic acid blends, 15% stearic acid*

| Sustane, Percent By Weight | Stearyl Citrate, Percent By Weight | Fade-O-Meter, 96 Hours Exposure Saybolt Color Before | Fade-O-Meter, 96 Hours Exposure Saybolt Color After |
|---|---|---|---|
| | | +22 | +14 |
| 0.0025 | | +20 | +10 |
| 0.0002 | | +20 | +13 |
| | 0.0002 | +30 | +20 |
| 0.0002 | 0.0002 | +25 | +20 |
| 0.0002 | 0.0025 | +22 | +20 |

Additional tests on paraffin wax-stearic acid blends, together with paraffin wax, are shown in Table VII given below.

TABLE VII

*Effect of antioxidant concentration upon the light stability of paraffin wax and paraffin wax-stearic acid blends stored in the Fade-O-Meter for 96 hours*

| Sustane, Percent By Weight | Stearyl Citrate, Percent By Weight | Wax Alone | Wax Stearic Acid (15%) | Hours +30 Saybolt Color | 96 Hours' Exposure Saybolt Color | |
|---|---|---|---|---|---|---|
| | | | | | Before | After |
| ------ | ------ | Yes | ------ | 2 | +30 | +17 |
| ------ | ------ | ------ | Yes | 0 | +22 | +14 |
| 0.0002 | 0.0002 | Yes | ------ | 24 | +30 | +21 |
| 0.0002 | 0.0002 | ------ | Yes | 0 | +25 | +20 |
| 0.0002 | 0.0025 | Yes | ------ | 48 | +30 | +28 |
| 0.0002 | 0.0025 | ------ | Yes | 0 | +22 | +20 |
| 0.0025 | 0.0002 | Yes | ------ | 96 | +30 | +30 |
| 0.0025 | 0.0002 | ------ | Yes | 0 | +20 | +18 |
| 0.0025 | 0.0025 | Yes | ------ | 24 | +30 | +14 |
| 0.0025 | 0.0025 | ------ | Yes | 0 | +22 | +8 |

Prior to this development antioxidants, which protected wax against elevated temperatures, did not protect wax against light. Also, materials which gave protection combinations of materials contemplated herein, and against light, did not give protection against heat. The particularly the combination of Sustane and stearyl citrate, provides protection against both heat and light.

Although the data set out above is primarily directed to the stabilization of petroleum waxes, it is broadly contemplated that the synergistic combination shown herein will be effective also for the stabilization of all materials susceptible to oxidation. That is, the invention contemplated herein is directed to the stabilization of fatty oils, marine oils, vegetable oils and the like. In the field of hydrocarbons, the invention is pointed to the stabilization of fully refined or semi-refined waxes derived from petroleum, Ozokerite and shale oils of all types. Stabilization of solid hydrocarbons of the aliphatic series ranging from 20 carbon atoms to about 35 carbon atoms is a primary object of this invention.

I claim:

1. Hydrocarbon wax containing from about 0.00005 to about 0.1 percent by weight of an hydroxyanisole containing a saturated alkyl group of at least four carbon atoms, and from about 0.00005 to about 0.1 percent by weight of an alkyl ester of citric acid containing at least one straight chain saturated alkyl group containing at least about twelve carbon atoms.

2. Hydrocarbon wax containing from about 0.00005 to about 0.1 percent by weight of a tertiary butyl hydroxyanisole and from about 0.00005 to about 0.1 percent by weight of tristearyl citrate.

3. Paraffin wax containing from about 0.00005 to about 0.1 percent by weight of a tertiary butyl hydroxyanisole and from about 0.00005 to about 0.1 percent by weight of stearyl citrate.

4. Paraffin wax containing from about 5 to about 40 percent by weight of stearic acid, from about 0.00005 to about 0.1 percent by weight of a tertiary butyl hydroxyanisole, and from about 0.00005 to about 0.1 percent by weight of stearyl citrate.

References Cited in the file of this patent

UNITED STATES PATENTS

| | | |
|---|---|---|
| 2,518,678 | Gooding et al. | Aug. 15, 1950 |
| 2,677,616 | Hall | May 4, 1954 |
| 2,683,694 | Hoffman et al. | July 13, 1954 |
| 2,704,746 | Chenicek | Mar. 22, 1955 |
| 2,715,073 | Lowry | Aug. 9, 1955 |
| 2,741,563 | Robertson | Apr. 10, 1956 |
| 2,772,170 | Hall | Nov. 27, 1956 |
| 2,813,032 | Hall | Nov. 12, 1957 |

UNITED STATES PATENT OFFICE
CERTIFICATE OF CORRECTION

Patent No. 2,860,065                                 November 11, 1958

Charles F. Duchacek

It is hereby certified that error appears in the printed specification of the above numbered patent requiring correction and that the said Letters Patent should read as corrected below.

Column 1, line 42, for "its is" read -- it is --; column 7, line 23, strike out "combinations of materials contemplated herein, and" and insert the same after "The" in line 24, same column.

Signed and sealed this 10th day of February 1959.

(SEAL)
Attest:

KARL H. AXLINE                                      ROBERT C. WATSON
Attesting Officer                                   Commissioner of Patents